United States Patent
Kolosnitsyn et al.

(10) Patent No.: US 10,038,223 B2
(45) Date of Patent: Jul. 31, 2018

(54) METHOD OF CHARGING A LITHIUM-SULPHUR CELL

(71) Applicant: Oxis Energy Limited, Oxfordshire (GB)

(72) Inventors: Vladimir Kolosnitsyn, Oxfordshire (GB); David Ainsworth, Oxfordshire (GB); Lukasz Kabacik, Oxfordshire (GB)

(73) Assignee: Oxis Energy Limited, Oxfordshire (GB)

( * ) Notice: Subject to any disclaimer, the term of this patent is extended or adjusted under 35 U.S.C. 154(b) by 22 days.

(21) Appl. No.: 14/768,679

(22) PCT Filed: Mar. 21, 2014

(86) PCT No.: PCT/GB2014/050888
§ 371 (c)(1),
(2) Date: Aug. 18, 2015

(87) PCT Pub. No.: WO2014/155068
PCT Pub. Date: Oct. 2, 2014

(65) Prior Publication Data
US 2016/0006082 A1    Jan. 7, 2016

(30) Foreign Application Priority Data

Mar. 25, 2013 (EP) .................................. 13160777
Oct. 15, 2013 (GB) .................................. 1318214.2

(51) Int. Cl.
*H01M 10/44* (2006.01)
*H01M 10/052* (2010.01)
(Continued)

(52) U.S. Cl.
CPC ......... *H01M 10/44* (2013.01); *H01M 10/052* (2013.01); *H01M 10/46* (2013.01);
(Continued)

(58) Field of Classification Search
USPC .................................. 320/132, 134, 162, 164
See application file for complete search history.

(56) References Cited

U.S. PATENT DOCUMENTS 3,030,720 A    4/1962   Osswald et al.
3,185,590 A    5/1965   Mayer et al.
(Continued)

FOREIGN PATENT DOCUMENTS

CN    1389948    1/2003
EP     764489    3/1997
(Continued)

OTHER PUBLICATIONS

Jeon et al. Solvent-Free Polymer Electrolytes Based on Thermally Annealed Porous P(VdF-HFP)/P(EO-EC) Membranes.
(Continued)

*Primary Examiner* — Brian Ngo
(74) *Attorney, Agent, or Firm* — Meyertons, Hood, Kivlin, Kowert & Goetzel, P.C.; Mark R. DeLuca

(57) ABSTRACT

A method for charging a lithium-sulphur cell, said method comprising: monitoring the voltage, V, of a cell during charge as a function of time, t, or capacity, Q, determining, in a voltage region in which the cell transitions between the first stage and second stage of charge, the reference capacity, $Q_{ref}$ of the cell at which $dV/dt$ or $dV/dQ$ is at a maximum, terminating charge when the capacity of the cell reaches $a.Q_{ref}$ where a is 1.1 to 1.4.

13 Claims, 2 Drawing Sheets

Figure 1:
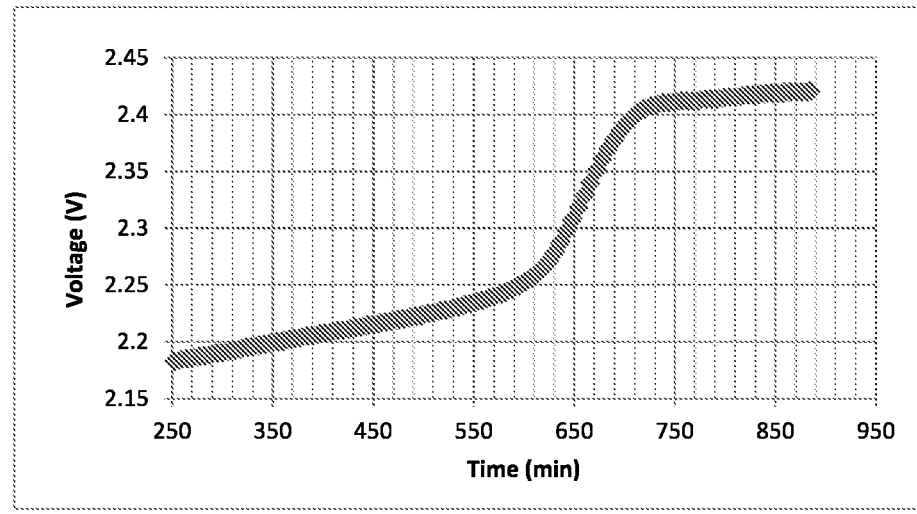

(51) Int. Cl.
  *H01M 10/46* (2006.01)
  *H02J 7/00* (2006.01)
  *H01M 10/42* (2006.01)

(52) U.S. Cl.
  CPC ............ *H02J 7/007* (2013.01); *H02J 7/0052* (2013.01); *H01M 2010/4271* (2013.01)

(56) References Cited

U.S. PATENT DOCUMENTS

| | | |
|---|---|---|
| 3,578,500 A | 5/1971 | Maricle et al. |
| 3,639,174 A | 2/1972 | Kegelman |
| 3,721,113 A | 3/1973 | Hovsepian |
| 3,778,310 A | 12/1973 | Garth |
| 3,877,983 A | 4/1975 | Hovsepian |
| 3,907,591 A | 9/1975 | Lauck |
| 3,907,597 A | 9/1975 | Mellors |
| 3,939,010 A | 2/1976 | Coleman et al. |
| 3,951,688 A | 4/1976 | Pankow et al. |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,218,523 A | 8/1980 | Kalnoki-Kis |
| 4,252,876 A | 2/1981 | Koch |
| 4,303,748 A | 12/1981 | Armand et al. |
| 4,318,430 A | 3/1982 | Perman |
| 4,410,609 A | 10/1983 | Peled et al. |
| 4,499,161 A | 2/1985 | Foos |
| 4,503,234 A | 3/1985 | Huwiler et al. |
| 4,503,378 A | 3/1985 | Jones et al. |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,368,958 A | 11/1994 | Hirai |
| 5,460,905 A | 10/1995 | Skotheim |
| 5,462,566 A | 10/1995 | Skotheim |
| 5,523,179 A | 6/1996 | Chu |
| 5,529,860 A | 6/1996 | Skotheim et al. |
| 5,532,077 A | 7/1996 | Chu |
| 5,582,623 A | 12/1996 | Chu |
| 5,587,253 A | 12/1996 | Gozdz et al. |
| 5,648,187 A | 7/1997 | Skotheim |
| 5,744,262 A | 4/1998 | Cheng et al. |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslavsky et al. |
| 6,030,720 A | 2/2000 | Chu et al. |
| 6,051,342 A | 4/2000 | Hamano et al. |
| 6,056,185 A | 5/2000 | Daroux et al. |
| 6,090,504 A | 7/2000 | Sung et al. |
| 6,117,590 A | 9/2000 | Skotheim et al. |
| 6,162,562 A | 12/2000 | Tsuji et al. |
| 6,174,621 B1 | 1/2001 | Skotheim et al. |
| 6,201,100 B1 | 3/2001 | Gorkovenko et al. |
| 6,210,831 B1 | 4/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz |
| 6,376,123 B1 | 4/2002 | Chu |
| 6,524,742 B1 | 2/2003 | Emanuel et al. |
| 6,537,704 B1 | 3/2003 | Akashi et al. |
| 6,544,691 B1 | 4/2003 | Guidotti |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 7,108,942 B1 | 9/2006 | Gan et al. |
| 7,250,233 B2 | 7/2007 | Choi et al. |
| 7,335,440 B2 | 2/2008 | Aamodt et al. |
| 7,354,680 B2 | 4/2008 | Mikhaylik et al. |
| 2001/0008736 A1 | 7/2001 | Fanta et al. |
| 2001/0019797 A1 | 9/2001 | Kezuka et al. |
| 2002/0022181 A1 | 2/2002 | Tsujioka et al. |
| 2002/0034688 A1 | 3/2002 | Chu et al. |
| 2002/0039677 A1 | 4/2002 | Iwamoto et al. |
| 2002/0045101 A1 | 4/2002 | Hwang et al. |
| 2002/0045102 A1 | 4/2002 | Youngiu et al. |
| 2002/0102466 A1 | 8/2002 | Hwang et al. |
| 2002/0160263 A1 | 10/2002 | Corrigan et al. |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0157411 A1* | 8/2003 | Jung .................. H01M 2/1653 429/317 |
| 2003/0175596 A1 | 9/2003 | Park |
| 2003/0180611 A1 | 9/2003 | Mikhaylik et al. |
| 2003/0190530 A1 | 10/2003 | Yang et al. |
| 2003/0232244 A1 | 12/2003 | Birke et al. |
| 2004/0002002 A1 | 1/2004 | Mitzuta et al. |
| 2004/0028999 A1 | 2/2004 | LaLiberte |
| 2004/0029014 A1 | 2/2004 | Hwang |
| 2004/0048164 A1 | 3/2004 | Jung et al. |
| 2004/0053129 A1 | 3/2004 | Jung et al. |
| 2004/0072066 A1 | 4/2004 | Cho et al. |
| 2004/0091776 A1 | 5/2004 | Hwang |
| 2004/0096744 A1 | 5/2004 | Sadamitsu et al. |
| 2004/0096750 A1 | 5/2004 | Kim et al. |
| 2004/0101753 A1 | 5/2004 | Hwang |
| 2004/0137330 A1 | 7/2004 | Lee et al. |
| 2004/0157132 A1 | 8/2004 | Kim et al. |
| 2004/0179328 A1 | 9/2004 | Ando et al. |
| 2004/0219428 A1 | 11/2004 | Nagayama |
| 2004/0222768 A1 | 11/2004 | Moore et al. |
| 2004/0258996 A1 | 12/2004 | Kim et al. |
| 2005/0017684 A1 | 1/2005 | Brecht |
| 2005/0136327 A1 | 6/2005 | Miyake et al. |
| 2005/0156575 A1 | 7/2005 | Mikhaylik |
| 2005/0175903 A1* | 8/2005 | Kim ...................... H01M 4/02 429/246 |
| 2005/0221192 A1 | 10/2005 | Hennige et al. |
| 2005/0238956 A1 | 10/2005 | Lee |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0105233 A1 | 5/2006 | Morita |
| 2006/0121355 A1 | 6/2006 | Kolosnitsyn et al. |
| 2006/0177741 A1 | 8/2006 | Kolosnitsyn et al. |
| 2006/0204856 A1 | 9/2006 | Ryu et al. |
| 2006/0208701 A1 | 9/2006 | Mikhaylik |
| 2006/0234126 A1 | 10/2006 | Kolosnitsyn et al. |
| 2006/0238203 A1* | 10/2006 | Kelley ............... G01R 31/3679 324/433 |
| 2006/0292451 A1 | 12/2006 | Lee et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0060189 A1 | 3/2008 | Daidoji et al. |
| 2008/0100264 A1 | 5/2008 | Kolosnitsyn et al. |
| 2008/0160407 A1 | 7/2008 | Ishii et al. |
| 2008/0193835 A1* | 8/2008 | Mikhaylik ............. H01M 4/13 429/156 |
| 2009/0027831 A1 | 1/2009 | Tasaki et al. |
| 2009/0053565 A1 | 2/2009 | Iacovelli |
| 2009/0111029 A1 | 4/2009 | Lee et al. |
| 2009/0246626 A1 | 10/2009 | Tasaki et al. |
| 2009/0317717 A1 | 12/2009 | Ryu et al. |
| 2010/0129724 A1 | 5/2010 | Kolosnitsyn et al. |
| 2010/0231168 A1 | 9/2010 | Kolosnitsyn et al. |
| 2010/0261048 A1 | 10/2010 | Kim et al. |
| 2010/0273048 A1 | 10/2010 | Machida et al. |
| 2011/0059361 A1 | 3/2011 | Wilkening et al. |
| 2011/0123866 A1 | 5/2011 | Pan et al. |
| 2011/0151317 A1 | 6/2011 | Giroud et al. |
| 2012/0282530 A1 | 11/2012 | Chiang et al. |

(56) References Cited

U.S. PATENT DOCUMENTS

| | | | |
|---|---|---|---|
| 2012/0293114 A1 | 11/2012 | Murochi et al. | |
| 2012/0315553 A1 | 12/2012 | Fuminori et al. | |
| 2013/0011717 A1 | 1/2013 | Yotsumoto | |
| 2013/0187466 A1 | 7/2013 | Sakai et al. | |
| 2013/0307485 A1 | 11/2013 | He et al. | |
| 2014/0009117 A1 | 1/2014 | Ishii et al. | |
| 2014/0079989 A1* | 3/2014 | Janakiraman | H01M 4/38 429/199 |
| 2014/0272610 A1 | 9/2014 | Amine et al. | |
| 2014/0377667 A1 | 12/2014 | Roschenthaler et al. | |
| 2015/0084603 A1* | 3/2015 | Thillaiyan | H01M 10/0567 320/162 |
| 2015/0147656 A1 | 5/2015 | Kogetsu et al. | |
| 2015/0234014 A1* | 8/2015 | Moganty | H01M 10/448 320/136 |

FOREIGN PATENT DOCUMENTS

| | | |
|---|---|---|
| EP | 924783 | 6/1999 |
| EP | 710995 | 3/2001 |
| EP | 1176659 | 1/2002 |
| EP | 1178555 | 2/2002 |
| EP | 1320143 | 6/2003 |
| EP | 1400996 | 3/2004 |
| EP | 1420475 | 5/2004 |
| EP | 1865520 | 12/2007 |
| EP | 1962364 | 8/2008 |
| EP | 2023461 | 2/2009 |
| EP | 2026402 | 2/2009 |
| EP | 2259376 | 12/2010 |
| FR | 2991104 | 11/2013 |
| GB | 2084391 | 4/1982 |
| GB | 2200068 | 7/1988 |
| GB | 2430542 | 3/2007 |
| JP | 59194361 | 11/1984 |
| JP | 64-107467 | 4/1989 |
| JP | 01-124969 | 5/1989 |
| JP | 04-217826 | 8/1992 |
| JP | 06-343233 | 12/1994 |
| JP | 08069812 | 3/1996 |
| JP | 8-138742 | 5/1996 |
| JP | 08138650 | 5/1996 |
| JP | 8298229 | 11/1996 |
| JP | 8298230 | 11/1996 |
| JP | 09-027328 | 1/1997 |
| JP | 9147913 | 6/1997 |
| JP | 63-081767 | 4/1998 |
| JP | 10284076 | 10/1998 |
| JP | 11-067261 | 3/1999 |
| JP | 11-273729 | 10/1999 |
| JP | 2001-167751 | 6/2001 |
| JP | 2001167751 | 6/2001 |
| JP | 2002-75446 | 3/2002 |
| JP | 2002-252036 | 9/2002 |
| JP | 2005-071641 | 3/2005 |
| JP | 2005-108724 | 4/2005 |
| JP | 2005-005215 | 6/2005 |
| JP | 2005-243342 | 9/2005 |
| JP | 2006134785 | 5/2006 |
| JP | 2009-087728 | 4/2009 |
| JP | 2009-187674 | 8/2009 |
| JP | 2010-262864 | 11/2010 |
| JP | 2011-124024 | 6/2011 |
| JP | 2011108469 | 6/2011 |
| JP | 2011-192574 | 9/2011 |
| JP | 2013-042598 | 2/2013 |
| KR | 10-2002-0089134 | 11/2002 |
| KR | 10-0368753 | 4/2003 |
| KR | 10-2003-0056497 | 7/2003 |
| KR | 10-2011-0024707 | 3/2011 |
| WO | 2001-047088 | 6/2001 |
| WO | 197304 | 12/2001 |
| WO | 2002-095849 | 11/2002 |
| WO | 2004021475 | 3/2004 |
| WO | 2006-050117 | 5/2006 |
| WO | 2007-111988 | 10/2007 |
| WO | 2007-132994 | 11/2007 |
| WO | 2013-045561 | 4/2013 |

OTHER PUBLICATIONS

Suo et al. "A New Class of Solvent-in-Salt Electrolyte for High-Energy Rechargeable Metallic Lithium Batteries" Nature Communications, 2013, vol. 4, p. 1481.

UK Search Report, Application No. GB 0416708.6, Section 17, dated Aug. 10, 2004.

UK Search Report, Application No. GB 0501001.2, dated Apr. 14, 2005.

Japanese Office Action for JP Application No. 2007-550839 dated Apr. 1, 2014.

Korean Office Action for Application No. 10-2013-7031637, dated Jan. 27, 2014.

International Search Report, Application No. PCT/GB2005/002850, dated Aug. 25, 2005.

Written Opinion, Application No. PCT/GB2005/002850, dated Aug. 25, 2005.

International Preliminary Report on Patentability, Application No. PCT/GB2005/002850, dated Jan. 30, 2007.

International Search Report, Application No. PCT/GB2006/000103, dated Jun. 20, 2007.

Written Opinion, Application No. PCT/GB2006/000103, dated Jun. 20, 2007.

International Preliminary Report on Patentability, Application No. PCT/GB2006/000103, dated Jul. 24, 2007.

International Search Report, Application No. PCT/GB2006/050300, dated Dec. 6, 2006.

Written Opinion, Application No. PCT/GB2006/050300, dated Dec. 6, 2006.

International Preliminary Report on Patentability, Application No. PCT/GB2006/050300, dated Mar. 26, 2008.

International Search Report, PCT Application No. PCT/GB2012/051633, dated Feb. 1, 2013.

Written Opinion, PCT Application No. PCT/GB2012/051633, dated Feb. 1, 2013.

International Preliminary Report on Patentability, PCT Application No. PCT/GB2012/051633, dated Jun. 17, 2014.

International Search Report, PCT Application No. PCT/GB2012/052728, dated Jan. 2, 2013.

Written Opinion, PCT Application No. PCT/GB2012/052728, dated Jan. 2, 2013.

International Preliminary Report on Patentability, PCT Application No. PCT/GB2012/052728, dated Aug. 19, 2014.

International Search Report, Application No. PCT/GB2014/05088, dated Jul. 7, 2014.

Written Opinion, Application No. PCT/GB2014/05088, dated Jul. 7, 2014.

International Preliminary Report on Patentability, Application No. PCT/GB2014/050888, dated Sep. 29, 2015.

International Search Report, Application No. PCT/GB2014/050890, dated Jun. 2, 2014.

Written Opinion, Application No. PCT/GB2014/050890, dated Jun. 2, 2014.

International Preliminary Report on Patentability, Application No. PCT/GB2014/050890, dated Sep. 29, 2015.

International Search Report, Application No. PCT/GB2014/050891, dated Jul. 24, 2014.

Written Opinion, Application No. PCT/GB2014/050891, dated Jul. 24, 2014.

International Preliminary Report on Patentability, Application No. PCT/GB2014/050891, dated Sep. 29, 2015.

International Search Report, Application No. PCT/GB2014/052474, dated Nov. 5, 2014.

Written Opinion, Application No. PCT/GB2014/052474, dated Nov. 5, 2014.

International Preliminary Report on Patentability, Application No. PCT/GB2014/052474, dated Feb. 16, 2016.

(56) References Cited

OTHER PUBLICATIONS

International Search Report, Application No. PCT/GB2014/053715, dated Feb. 27, 2015.
Written Opinion, Application No. PCT/GB2014/053715, dated Feb. 27, 2015.
International Preliminary Report on Patentability, Application No. PCT/GB2014/053715, dated Jun. 21, 2016.
International Search Report, Application No. PCT/GB2014/053719, dated Feb. 24, 2015.
Written Opinion, Application No. PCT/GB2014/053719, dated Feb. 24, 2015.
International Preliminary Report on Patentability, Application No. PCT/GB2014/053719, dated Jun. 21, 2016.
Cowie et al. "Ion Conduction in Macroporous Polyethylene Film Doped With Electrolytes" Solid State Ionics 109 (1998) 139-144.
U.S. Appl. No. 12/527,701, dated Jun. 18, 2009, Kolosnitsyn et al.
U.S. Appl. No. 11/190,203, filed Jul. 27, 2005, Kolosnitsyn et al.
U.S. Appl. No. 11/332,471, filed Jan. 17, 2006, Kolosnitsyn et al.
U.S. Appl. No. 11/386,113, filed Mar. 22, 2006, Kolosnitsyn et al.
U.S. Appl. No. 60/721,062, filed Sep. 28, 2005, Kolosnitsyn et al.
Bates et al., "Solvent Effects on Acid-Base Behavior: Five Uncharged Acids in Water-Sulfolane Solvents", 1976, Journal of Solution Chemistry, vol. 5, No. 3, p. 213-222.
Definitions of "slurry" and "suspension", Merriam Webster's, Collegiate Dictionary (10th Edition), printed Feb. 4, 2008.
Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.
Chagnes et al., "Butyrolactone-Ethylene Carbonate Based Electrolytes for Lithium Ion Batteries", Jul. 2003, Journal of Applied Electrochemistry, 33, p. 589-595.
Yamin H., Peled E, "Electrochemistry of a Nonaqueous Lithium/Sulphur Cell", J of Power Sources, 1983, vol. 9, p. 281-287.
D. Aurbach, E. Zinigrad, Y. Cohen, H. Teller, "A Short Review of Failure Mechanisms of Lithium Metal and Lithiated Graphite Anodes in Liquid Electrolyte Solutions", Solid State Ionics, 2002, vol. 148, p. 405-416.
Duck-Rye Chang, Suck-Hyun Lee, Sun-Wook Kim, Hee-Tak Kim, "Binary Electrolyte Based on Tetra (ethylene glycol) Dimethyl Ether and 1,3-dioxolane for Lithium-Sulphur Battery", J. Power Sources, 2002, vol. 112, p. 452-460.
Yamin H., Penciner J., Gorenshtein A., Elam M., Peled E., "The Electrochemical Behavior of Polysulphides in Tetrahydrofuran", J. of Power Sources, 1985, vol. 14, p. 129-134.
Yamin H., Gorenshtein A., Penciner J., Sternberg Y., Peled E., "Lithium Sulphur Battery Oxidation/Reduction Mechanisms of Polysulphides in THF Solution", J. Electrochem Soc. 1988, vol. 135, No. 5, p. 1045-1048.
J. Paris, V. Plichon, "Electrochemical Reduction of Sulphur in Dimethylacetamide", Electrochimica Acta, 1981, vol. 26, No. 12, p. 1823-1829.
Levillain E., Gaillard F., Leghie P., Demortier A., Lelieu J.P., "On the Understanding of the Reduction of Sulphur (S8) in Dimethylformamide (DMF)", J. of Electroanalytical Chemistry, 1997, vol. 420, p. 167-177.
Peled E., Gorenshrein A., Segal M., Sternberg Y, "Rechargeable Lithium-Sulphur Battery (extended abstract)", J. of Power Sources, 1989, vol. 26, p. 269-271.
Peled E., Sternberg Y., Gorenshtein A., Lavi Y., "Lithium-Sulphur Battery: Evaluation of Dioxolane-Based Electrolytes", J. Electrochem Soc., 1989, vol. 136, No. 6, p. 1621-1625.
Rauh R.D. Abraham K.M., Pearson G.F., Surprenant J.K., Brummer S.B., "A Lithium/Dissolved Sulphur Battery with an Organic Electrolyte", J. Electrochem Soc., 1979, vol. 126, No. 4, p. 523-527.
Rauh R.D., Shuker F.S., Marston J.M., Brummer S.B., "Formation of Lithium Polysulphides in Aprotic Media", J. inorg. Nucl Chem, 1977, vol. 39, p. 1761-1766.
Shin-Ichi Tobishima, Hideo Yamamoto, Minoru Matsuda, "Study on the Reduction Species of Sulfur by Alkali Metals in Nonaqueous Solvents", Electrochimica Acta, 1997, vol. 42, No. 6, p. 1019-1029.
Taitiro Fujinaga, Tooru Kuwamoto, Satoshi Okazaki, Masashi Horo, "Electrochemical Reduction of Elemental Sulphur in Acetonitrile", Bull Chem. Soc. Jpn. 1980, vol. 53, p. 2851-2855.
Gholam-Abbas Nazri, Gianfranco Pistoia, "Lithium Batteries: Science and Technology", 2003, p. 509-573, Hardcover, ISBN: 978-1-4020-7628-2.
Office Action, U.S. Appl. No. 11/290,825, dated Jun. 11, 2009.
Office Action, U.S. Appl. No. 11/526,876, dated Oct. 30, 2009.
Office Action, U.S. Appl. No. 11/190,203, dated Oct. 9, 2009.
Office Action, U.S. Appl. No. 11/190,203, dated Apr. 3, 2009.
Office Action, U.S. Appl. No. 11/332,471, dated Jul. 31, 2009.
Office Action, U.S. Appl. No. 11/332,471, dated Feb. 26, 2009.
Office Action, U.S. Appl. No. 11/332,471, dated Aug. 27, 2008.
Office Action, U.S. Appl. No. 11/332,471, dated Sep. 28, 2007.
Office Action, U.S. Appl. No. 11/332,471, dated Mar. 11, 2008.
Office Action, U.S. Appl. No. 11/332,471, dated Feb. 20, 2007.
Office Action, U.S. Appl. No. 11/332,471, dated Aug. 21, 2007.
Office Action, U.S. Appl. No. 11/386,113, dated Jan. 6, 2009.
Office Action, U.S. Appl. No. 11/386,113, dated Aug. 19, 2008.
Office Action, U.S. Appl. No. 11/386,113, dated Feb. 5, 2008.
Notice of Allowance, U.S. Appl. No. 11/386,113, dated Jul. 24, 2009.
Office Action, U.S. Appl. No. 11/889,334, dated Aug. 14, 2009.
"Transportation Regulations for Lithium, Lithium Ion and Polymer Cells and Batteries", Ultralife Batteries, Inc. Rev. H, Dec. 18, 2003.
V.S. Kolosnitsyn, L.V. Sheina and S.E. Mochalov, "Physicochemical and Electrochemical Properties of Sulfolane Solutions of Lithium Salts", May 2008, p. 575-578, MAIK Nauka/Interperiodica distributed exclusively by Springer Science+Business Media, LLC.

* cited by examiner

METHOD OF CHARGING A LITHIUM-SULPHUR CELL

The present invention relates to a method of charging a lithium-sulphur battery. The present invention also relates to a battery management system for charging a lithium-sulphur battery.

BACKGROUND

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with a solvent and a binder to form a slurry. The slurry is applied to a current collector and then dried to remove solvent. The resulting structure is calendared to form a composite structure, which is cut into the desired shape to form a cathode. A separator is placed on the cathode and a lithium anode placed on the separator. Electrolyte is then introduced into the assembled cell to wet the cathode and separator.

Lithium-sulphur cells are secondary cells. When a lithium-sulphur cell is discharged, the sulphur in the cathode is reduced in two-stages. In the first stage, the sulphur (e.g. elemental sulphur) is reduced to polysulphide species, $S_n^{2-}$ (n≥2). These species are generally soluble in the electrolyte. In the second stage of discharge, the polysulphide species are reduced to lithium sulphide, $Li_2S$, which, typically, deposits on the surface of the anode.

When the cell is charged, the two-stage mechanism occurs in reverse, with the lithium sulphide being oxidised to lithium polysulphide and thereafter to lithium and sulphur. This two-stage mechanism can be seen in both the discharging and charging profiles of a lithium-sulphur cell. Accordingly, when a lithium-sulphur cell is charged, its voltage typically passes through an inflexion point as the cell transitions between the first and second stage of charge.

Lithium-sulphur cells may be (re)charged by applying an external current to the cell. Typically, the cell is charged to a fixed cut-off voltage of, for example, 2.45 V. However, with repeated cycling over an extended period, the capacity of the cell may fade. Indeed, after a certain number of cycles, it may no longer be possible to charge the cell to the fixed cut-off voltage because of the increasing internal resistance of the cell. By repeatedly charging the cell to the selected cut-off voltage, the cell may eventually be repeatedly overcharged. This can have a detrimental effect on the longevity of the cell, as undesirable chemical reactions may lead to damage to, for example, the cell's electrodes and/or electrolytes.

In view of the foregoing, it is desirable to avoid overcharging the lithium-sulphur cell. WO 2007/111988 describes a process for determining the point at which a lithium sulphur cell becomes fully charged. Specifically, this reference describes adding an N—O additive, such as lithium nitrate, to the electrolyte of the cell. According to the passage at page 16, lines 29 to 31, of this reference, the additive is effective in providing a charge profile with a sharp increase in voltage at the point of full charge. Accordingly, charging can be terminated once this rapid increase in voltage is observed. This sharp increase in voltage occurs once the second stage of charge is complete, at voltages beyond the inflexion point between the two stages of charge described above.

The method of WO 2007/111988 relies on the voltage of the cell increasing very sharply as the cell reaches full capacity. Not all lithium-sulphur cells, however, exhibit such a charging profile.

SUMMARY OF THE INVENTION

According to the present invention, there is provided a method for charging a lithium-sulphur cell, said method comprising:
    monitoring the voltage, V, of a cell during charge as a function of time (t) or capacity (Q),
    determining in a voltage region in which the cell transitions between the first stage and second stage of charge the reference capacity, $Q_{ref}$, of the cell at which dV/dt or dV/dQ is at a maximum,
    terminating charge when the capacity of the cell reaches $a.Q_{ref}$, where a is 1.1 to 1.4.
Preferably, a is 1.2 to 1.3, more preferably 1.25.

When a lithium-sulphur cell is discharged, the sulphur material present in the cathode is reduced in two-stages. In particular, the sulphur is first reduced to polysulphide species, $S_n^{2-}$ (n≥2), in the first stage of discharge. These polysulphide species are generally soluble in the electrolyte. In the second stage of discharge, the polysulphide species are reduced to lithium sulphide, $Li_2S$, which deposits on the surface of the lithium anode.

When the cell is charged, the two-stage mechanism occurs in reverse, with lithium sulphide being oxidised to lithium polysulphide and thereafter to lithium and sulphur. This two-stage mechanism can be seen in both the discharging and charging profiles of lithium-sulphur cells. Thus, when a lithium-sulphur cell is charged, its voltage passes through an inflexion point with time, as the cell transitions between the first and second stage of charge. FIG. 1 is a charging profile of a lithium-sulphur cell, showing the inflexion point between the two stages of charge.

In the present invention, the reference capacity, $Q_{ref}$, at the inflexion point is determined by determining the capacity at which dV/dt or dV/dQ is at a maximum. The inflexion point occurs in the voltage region where the cell transitions between the first stage and second stage of charge. Thus, the inflexion point does not occur beyond the second stage of charge as the cell approaches full charge. Instead, the inflexion point is advantageously a reference point that occurs between the first and second stages of charge from which the termination voltage of a cell at a particular charging cycle can be determined. Typically, the inflexion point occurs when a significant proportion of the cathodic sulphur material (e.g. elemental sulphur) is still dissolved in the electrolyte (e.g. as polysulphide). Preferably, the inflexion point occurs when at least 80%, more preferably at least 90%, yet more preferably at least 95% of the cathodic sulphur material is dissolved in the electrolyte (e.g. as polysulphide). The percentage of cathodic sulphur material dissolved in solution can be determined by known methods, for example, from the amount of residual solid sulphur in a cell as a percentage of the initial amount of sulphur material introduced as the cathodic material.

In a preferred embodiment, the point at which dV/dt or dV/dQ is a maximum is determined at a voltage less than 2.4 V. Typically, the cell transitions between the first stage and second stage of discharge between 1.5 to 2.4V, preferably 1.8 to 2.38 V, more preferably 1.9 to 2.35 V, for example, 2.0 to 2.35 V. The value of dV/dt or dV/dQ, therefore, is advantageously calculated within such voltage ranges. In one embodiment, the value of dV/dt or dV/dQ is calculated at selected points within such voltage ranges. For the avoidance of doubt, the capacity of the cell, $Q_{ref}$, at which dV/dt or dV/dQ is a maximum can be determined by methods that are well-known in the art. For example, the capacity, Q, of the cell may be determined by multiplying current by time in the case where the cell is charged using a constant current. Even if dV/dQ is determined, therefore, the value of $Q_{ref}$ can be readily calculated.

In one embodiment, the reference capacity, $Q_{ref}$, is determined by calculating dV/dt or dV/dQ of the charging cycle as the voltage of the cell increases, for example, to a value of 2.4 or lower, preferably 2.38 V or lower, more preferably 2.35 V or lower. In one embodiment, the reference capacity, $Q_{ref}$, is determined by calculating dV/dt or dV/dQ of the charging cycle as the voltage of the cell increases, for example, from a value of 1.5 V or higher, preferably 1.8 V or higher, more preferably 1.9 V or higher, for example, 2.0 V or higher. In a preferred embodiment, the reference capacity, $Q_{ref}$, is determined by calculating dV/dt or dV/dQ, for example, at least in a selected voltage range of 1.5 to 2.4V, preferably 1.8 to 2.38 V, more preferably 1.9 to 2.35, even more preferably from 2.0 to 2.35 V, yet more preferably 2.1 to 2.35, for example, 2.2 to 2.35. In one embodiment, the reference capacity, $Q_{ref}$, is determined by calculating dV/dt or dV/dQ, for example, in a selected voltage range of 2.25 to 2.35. The values of dV/dt or dV/dQ may be determined at selected points within a range and the maximum value of dV/dt or dV/dQ may be determined or calculated from these selected points.

Because the reference capacity, $Q_{ef}$, will vary depending on the specific charge cycle of the cell, the cut-off voltage of the cell will vary depending on the current or contemporaneous characteristics (e.g. voltage vs time charging profile) of the cell. For example, as the cell ages, the characteristics (e.g. voltage vs time charging profile) of the cell may change and, as a result, so will the value of $Q_{ref}$ and the cut-off or termination point as determined by the method of the present invention. The risk of over-charging a cell using the method of the present invention, therefore, is reduced, as the cut-off point can be determined depending on the current or contemporaneous characteristics of the cell during each individual charge cycle. Advantageously, this reduces the risk of capacity fade. In contrast, in conventional methods of charging a lithium sulphur cell, the cell is charged to a pre-determined voltage or capacity irrespective of the charging characteristics of the cell and the extent to which the cell has experienced capacity fade. The risk of overcharging the cell, therefore, is significant, particularly as the cell ages.

In one embodiment of the present invention, it may be desirable to calculate dV/dt or dV/dQ at a plurality of points, for example, in a selected voltage range. The values of $d^2V/dt^2$ or $d^2V/dQ^2$ may also be determined to ascertain when $d^2V/dt^2$ or $d^2V/dQ^2$ is zero in order to confirm that dV/dt or dV/dQ is indeed at its maximum. Preferably, the charge is terminated when dV/dt or dV/dQ is at its maximum and $d^2V/dt^2$ or $d^2V/dQ^2$ is zero. In one embodiment, the charge is terminated when dV/dt is at its maximum and $d^2V/dt^2$ is zero. In another embodiment, the charge is terminated when dV/dQ is at its maximum and $d^2V/dQ^2$ is zero. For the avoidance of doubt, the point at which dV/dt or dV/dQ is at its maximum and $d^2V/dt^2$ or $d^2V/dQ^2$ is zero occurs as the cell transitions between the first and second stage of charge as discussed above.

In another aspect of the present invention, there is provided a battery management system for carrying out the method as described above. In yet another aspect, there is provided a battery management system for a lithium-sulphur battery, said system comprising:

means for monitoring the voltage, V, of a cell during charge as a function of time, t, or capacity, Q, means for determining in the voltage region where the cell transitions between the first stage and second stage of charge, a reference capacity, $Q_{ref}$, of the cell at which dV/dt is at a maximum, and, means for terminating charge when the capacity of the cell reaches $a.Q_f$, where a is 1.1 to 1.4.

The system may additionally include means for coupling the system to a lithium-sulphur battery. Preferably, the system comprises a lithium sulphur battery.

In a preferred embodiment, the lithium-sulphur cell is charged by supplying electric energy at constant current. The current may be supplied so as to charge the cell in a time ranging from 30 minutes to 12 hours, preferably 8 to 10 hours. The current may be supplied at a current density ranging from 0.1 to 3 mA/cm$^2$, preferably 0.1 to 0.3 mA/cm$^2$. As an alternative to charging at a constant current, it may also be possible to charge the lithium-sulphur cell to a constant voltage until the relevant capacity is reached. Suitable voltages range from 2.4-3.0V.

The electrochemical cell may be any suitable lithium-sulphur cell. The cell typically includes an anode, a cathode, an electrolyte and, advantageously, a porous separator positioned between the anode and cathode. The anode may be formed of lithium metal or a lithium metal alloy. Preferably, the anode is a metal foil electrode, such as a lithium foil electrode. The lithium foil may be formed of lithium metal or lithium metal alloy.

The cathode of the electrochemical cell includes a mixture of electroactive sulphur material and electroconductive material. This mixture forms an electroactive layer, which may be placed in contact with a current collector.

The mixture of electroactive sulphur material and electroconductive material may be applied to the current collector in the form of a slurry in an solvent (e.g. water or an organic solvent). The solvent may then be removed and the resulting structure calendared to form a composite structure, which may be cut into the desired shape to form a cathode. A separator may be placed on the cathode and a lithium anode placed on the separator. Electrolyte may then be introduced into the assembled cell to wet the cathode and separator.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre and carbon nanotubes. Other suitable materials include metal (e.g. flakes, filings and powders) and conductive polymers. Preferably, carbon black is employed.

The weight ratio of electroactive sulphur material (e.g. elemental sulphur) to electroconductive material (e.g. carbon) may be 1 to 30:1; preferably 2 to 8:1, more preferably 5 to 7:1.

The mixture of electroactive sulphur material and electroconductive material may be a particulate mixture. The mixture may have an average particle size of 50 nm to 20 microns, preferably 100 nm to 5 microns.

The mixture of electroactive sulphur material and electroconductive material (i.e. the electroactive layer) may optionally include a binder. Suitable binders may be formed from at least one of, for example, polyethyelene oxide, polytetrafluoroethylene, polyvinylidene fluoride, ethylene-propylene-diene rubber, methacrylate (e.g. UV-curable methacrylate), and divinyl esters (e.g. heat curable divinyl esters).

As discussed above, the cathode of the electrochemical cell may further comprise a current collector in contact with the mixture of electroactive sulphur material and solid electroconductive material. For example, the mixture of electroactive sulphur material and solid electroconductive material is deposited on the current collector. A separator is also disposed between the anode and the cathode of the electrochemical cell. For example, the separator may be in contact with the mixture of electroactive sulphur material and solid electroconductive material, which, in turn, is in contact with the current collector.

Suitable current collectors include metal substrates, such as foil, sheet or mesh formed of a metal or metal alloy. In a preferred embodiment, the current collector is aluminium foil.

The separator may be any suitable porous substrate that allows ions to move between the electrodes of the cell. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Preferably, the electrolyte comprises at least one lithium salt and at least one organic solvent. Suitable lithium salts include at least one of lithium hexafluorophosphate ($LiPF_6$), lithium hexafluoroarsenate ($LiAsF_6$), lithium perchlorate ($LiClO_4$), lithium trifluoromethanesulfonimide ($LiN(CF_3SO_2)_2$)), lithium borofluoride and lithium trifluoromethanesulphonate ($CF_3SO_3Li$). Preferably the lithium salt is lithium trifluoromethanesulphonate.

Suitable organic solvents are tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1,3-dioxolane, diglyme (2-methoxyethyl ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N,N,N,N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

In one embodiment, the electrolyte comprises lithium trifluoromethanesulphonate and sulfolane.

The weight ratio of electrolyte to the total amount of electroactive sulphur material and electroconductive material is 1-15:1; preferably 2-9:1, more preferably 6-8:1.

EXAMPLES

Figure 2:
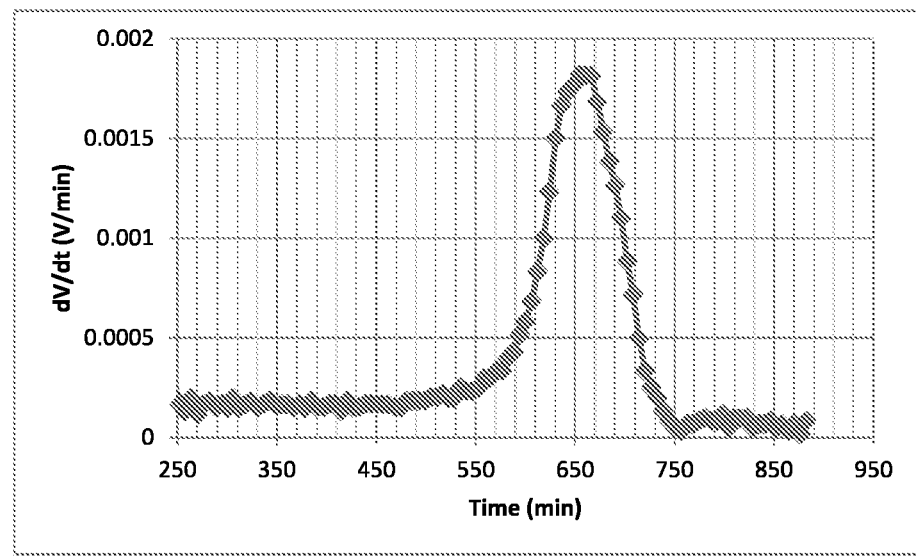
Figure 3:
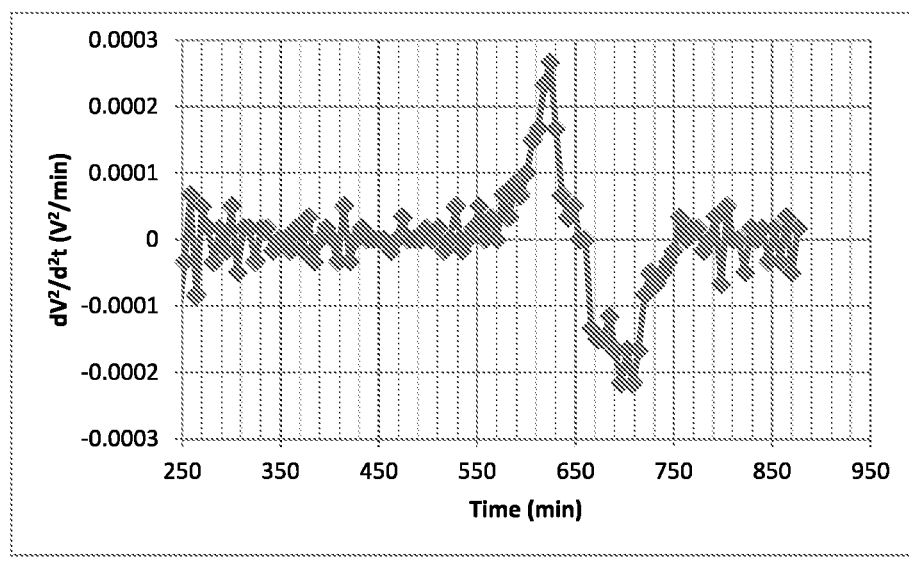

In this example, the voltage, V, of a cell during charge as a function of time (t) was monitored. The voltage was plotted as a function of time in FIG. 1. As can be seen from FIG. 1, the cell transitions between a first stage of charge to a second stage of charge in the region between about 2.2 V and 2.4 V. In this region, a reference capacity, $Q_{ref}$, of the cell is determined by calculating dV/dt at a range of points. The reference capacity, $Q_{ref}$, is determined at the point at which dV/dt is at a maximum, and, $d^2V/dt^2$ is zero (see FIGS. 2 and 3). This is the inflexion point between the first and second stages of discharge. In this Example, charging of the cell was terminated when the capacity reached $1.25Q_{ref}$. This process may be repeated for each charge cycle of the cell. In this way, the termination voltage will be determined according to the specific characteristics (e.g. charging profile) of the cell at the charge cycle in question. This reduces the risk of over-charging, as the termination voltage will vary depending on the extent of capacity fade.

The invention claimed is:

1. A method for charging a lithium-sulphur cell, said method comprising:
   coupling the lithium-sulphur cell to a battery management system, wherein the battery management system comprises a means for monitoring the voltage of the cell, and a means for terminating charge,
   monitoring the voltage, V, of the lithium-sulphur cell during charge as a function of time, t, and/or capacity, Q,
   determining the reference capacity, $Q_{ref}$, of the lithium-sulphur cell, wherein $Q_{ref}$ is determined by calculating, in the voltage region at which the cell transitions between the first stage and second stage of charge, the point at which dV/dt or dV/dQ is at a maximum and $d^2V/dt^2$ or $d^2V/dQ^2$ is zero
   terminating charge when the capacity of the cell reaches $a*Q_{ref}$ where a is 1.1 to 1.4.

2. The method of claim 1, wherein a is 1.2 to 1.3.

3. The method of claim 1, wherein a is 1.25.

4. The method of claim 1, wherein the voltage region at which the cell transitions between the first stage of charge and the second stage of charge is 1.5 to 2.4 V.

5. The method of claim 1, wherein the voltage region at which the cell transitions between the first stage of charge and the second stage of charge is 1.9 to 2.35 V.

6. The method of claim 1, wherein the reference capacity, $Q_{ref}$, is determined by calculating dV/dt or dV/dQ in a selected voltage range of 1.5 to 2.4V.

7. The method of claim 1, wherein the reference capacity, $Q_{ref}$, is determined by calculating dV/dt or dV/dQ in a selected voltage range of 1.9 to 2.35 V.

8. The method of claim 1, further comprising repeating the method for at least two charge cycles of a lithium-sulphur cell.

9. The method of claim 1, further comprising repeating the method for each charge cycle of a lithium-sulphur cell.

10. A battery management system for a lithium-sulphur battery, said system comprising:
    a charging system couplable to the lithium-sulphur battery, the charging system comprising a voltage monitor, coupled to the charging system, configured to monitor the voltage, V, of the lithium-sulphur battery during charging as a function of time, t, and/or capacity, Q, wherein the charging system determines, in the voltage region where the lithium-sulphur battery transitions between the first stage and second stage of charge, a reference capacity, $Q_{ref}$, of the cell, wherein the reference capacity, $Q_{ref}$, is determined by calculating, in the voltage region at which the cell transitions between the first stage and second stage of charge, the point at which $dV/dt$ or $dV/dQ$ is at a maximum and $d^2V/dt^2$ or $d^2V/dQ^2$ is zero and, wherein the charging system terminates charging of the lithium-sulphur battery when the capacity of the lithium-sulphur battery reaches $a*Q_{ref}$, where a is 1.1 to 1.4.

11. The system of claim 10, wherein the charging system further determines the reference capacity, $Q_{ref}$, at which $dV/dt$ or $dV/dQ$ is at a maximum and $d^2V/dt^2$ or $d^2V/dQ^2$ is zero.

12. The system of claim 10, further comprising a coupling device configured to receive the lithium-sulfur battery and couple the lithium-sulfur battery to the charging system.

13. The system of claim 10, further comprising a lithium-sulphur battery.

* * * * *